United States Patent
Mantzke et al.

(10) Patent No.: US 10,439,999 B2
(45) Date of Patent: Oct. 8, 2019

(54) POINT-TO-POINT SECURE DATA STORE AND COMMUNICATION SYSTEM AND METHOD

(71) Applicants: Michael T. Mantzke, Aurora, IL (US); David Malmstedt, Aurora, IL (US)

(72) Inventors: Michael T. Mantzke, Aurora, IL (US); David Malmstedt, Aurora, IL (US)

(*) Notice: Subject to any disclaimer, the term of this patent is extended or adjusted under 35 U.S.C. 154(b) by 115 days.

(21) Appl. No.: 15/315,571

(22) PCT Filed: Aug. 2, 2015

(86) PCT No.: PCT/US2015/043346
§ 371 (c)(1),
(2) Date: Dec. 1, 2016

(87) PCT Pub. No.: WO2015/188202
PCT Pub. Date: Dec. 10, 2015

(65) Prior Publication Data
US 2017/0118184 A1    Apr. 27, 2017

Related U.S. Application Data

(60) Provisional application No. 62/006,491, filed on Jun. 2, 2014.

(51) Int. Cl.
*H04L 29/06* (2006.01)
*G06F 21/10* (2013.01)
(Continued)

(52) U.S. Cl.
CPC .......... *H04L 63/0478* (2013.01); *G06F 21/10* (2013.01); *H04L 9/0869* (2013.01);
(Continued)

(58) Field of Classification Search
CPC ... H04L 63/08; H04L 63/0478; H04L 63/062; H04L 9/14; H04L 9/0869; G06F 21/10; G06F 21/60
(Continued)

(56) References Cited

U.S. PATENT DOCUMENTS 6,978,022 B2 * 12/2005 Okimoto ............... H04N 7/165
                                                       348/E7.056
7,490,067 B1 * 2/2009 Huber .................. H04N 7/147
                                                       705/50

(Continued)

FOREIGN PATENT DOCUMENTS

WO    WO2002079955 A2    10/2002

*Primary Examiner* — Saleh Najjar
*Assistant Examiner* — Khalid M Almaghayreh
(74) *Attorney, Agent, or Firm* — The Law Firm of H. Dale Langley, Jr. P.C.

(57) ABSTRACT

A method for encryption of a private media package by a first processing device which includes at least three key components of a regret management flag, a rules set, and a media object, encrypting with a first key the regret management flag, encrypting with the first key the rules set, encrypting with the first key the media object(s), obtaining a randomized result key, bit shifting the regret management flag from encrypting with the first key the management flag, via the randomized result key, bit shifting the rules set from encrypting with the first key the rules set, via the randomized key, bit shifting the media object(s) from encrypting with the first key the media object(s), via the randomized key, encrypting with a second key the regret management flag from encrypting and bit shifting the regret management flag, encrypting with the second key the rules set from encrypting and bit shifting the rules set, encrypting with the second key the media object(s) from encrypting and bit shifting the media object(s), storing as an encrypted package the regret management flag of the encrypting with the second key the regret management flag, the rules set of the encrypting with the second key the rules set, and the media object(s) of the encrypting with the second key the media object. Decryption is by reverse of the encryption process, and the resulting decrypted private media package may be used only in compliance with the rules set.

7 Claims, 11 Drawing Sheets

(51) Int. Cl.
*H04L 9/08* (2006.01)
*H04L 9/14* (2006.01)

(52) U.S. Cl.
CPC ........ *H04L 9/14* (2013.01); *G06F 2221/0717* (2013.01); *G06F 2221/2111* (2013.01)

(58) Field of Classification Search
USPC ....... 713/167, 168, 170, 171, 189, 153, 154, 713/193; 726/4, 26, 27
See application file for complete search history.

(56) References Cited

U.S. PATENT DOCUMENTS

| | | |
|---|---|---|
| 8,429,424 B2 | 4/2013 | Initt et al. |
| 8,782,440 B2* | 7/2014 | Nin .......................... G06F 21/10 713/189 |
| 2001/0053222 A1* | 12/2001 | Wakao ........... H04N 21/234318 380/43 |
| 2002/0184358 A1* | 12/2002 | Traversat ............... G06F 9/4416 709/223 |
| 2003/0191937 A1* | 10/2003 | Balissat .............. H04L 63/0272 713/163 |
| 2005/0058293 A1* | 3/2005 | Higurashi ................ H04L 9/12 380/274 |
| 2005/0144260 A1* | 6/2005 | Han .................. H04L 29/12311 709/219 |
| 2008/0086422 A1* | 4/2008 | Wolff ...................... G06F 21/10 705/50 |
| 2010/0070778 A1 | 3/2010 | Murray |
| 2010/0228971 A1* | 9/2010 | Carles .................. H04L 9/3271 713/163 |
| 2013/0152169 A1* | 6/2013 | Stuntebeck ............. H04L 67/16 726/4 |
| 2013/0275973 A1* | 10/2013 | Greenfield .......... G06F 9/44584 718/1 |
| 2014/0245004 A1 | 8/2014 | Houston |
| 2014/0359277 A1 | 12/2014 | McGrew |
| 2018/0241871 A1* | 8/2018 | Sarafa ............... H04M 1/72552 |

* cited by examiner

POINT-TO-POINT SECURE DATA STORE AND COMMUNICATION SYSTEM AND METHOD

TECHNICAL FIELD

The invention generally relates to devices and security, and more particularly relates to systems and methods for securing data stores and communications of processing devices.

BACKGROUND

Security of data and information is a major concern. Industries, as diverse as healthcare, defense, legal, and others, require secure storage and communications. Communications of digital devices over communications networks may be vulnerable to security issues, such as interception and misuse. Further, data stored in digital devices may be vulnerable to intrusion, for example, upon theft, loss, or lack or failure of authentication controls. Encryption can provide some level of security, however, an encrypted package may be subject to decryption by unauthorized parties. Moreover, that level of security cannot allow for control of distribution and use of the encrypted data and information that is stored or communicated.

SUMMARY

An embodiment of the invention is a system for point-to-point security of media objects communicated on a telecommunications network. The system includes a first processing device communicatively connected to the telecommunications network. The first processing device includes instructions stored in tangible media for creating a private media package of a regret management flag, a rules set, and a media object(s), generating a first unique encryption key (first key), encrypting with the first key the regret management flag, encrypting with the first key the rules set, encrypting with the first key the media object(s), obtaining a randomized result key, bit shifting the regret management flag from encrypting with the first key the regret management flag, via the randomized result key, bit shifting the rules set from encrypting with the first key the rules set, via the randomized key, bit shifting the media object(s) from encrypting with the first key the media object, via the randomized key, generating a second unique encryption key (second key), encrypting with the second key the regret management flag from encrypting and bit shifting the regret management flag, encrypting with the second key the rules set from encrypting and bit shifting the rules set, encrypting with the second key the media object(s) from encrypting and bit shifting the media object, and storing as an encrypted private media package the regret management flag of the encrypting with the second key the regret management flag, the rules set of the encrypting with the second key the rules set, and the media object(s) of the encrypting with the second key the media object.

In further aspects, the system includes a second processing device communicatively connected to the first processing device via the telecommunications network. The second processing device includes instructions stored in tangible media for obtaining the second key, decrypting with the second key the regret management flag, decrypting with the second key the rules set, decrypting with the second key the media object(s), obtaining the randomized result key, reverse bit shifting the regret management flag from decrypting with the second key the regret management flag, via the randomized result key, reverse bit shifting the rules set from decrypting with the second key the rules set, via the randomized key, reverse bit shifting the media object(s) from decrypting with the second key the media object, via the randomized key, obtaining the first key, decrypting with the first key the regret management flag from decrypting with the second key and reverse bit shifting the regret management flag, decrypting with the first key the rules set from decrypting with the second key and reverse bit shifting the rules set, decrypting with the first key the media object(s) from decrypting with the second key and reverse bit shifting the media object, and outputting as a decrypted private media package the regret management flag of the decrypting with the first key the regret management flag, the rules set of the decrypting with the first key the rules set, and the media object(s) of the decrypting with the first key the media object.

In yet further aspects, the system includes a server device communicatively connected to the first processing device by the telecommunications network. The server device includes instructions stored in tangible media for storing records of authorization for the first processing device, storing the encrypted private media package, checking authorization of the first processing device, forwarding the private media package to authorized second processing device(s), sending a first message to the first processing device if the second processing device performs the steps of decryption, sending a second message to the first processing device if the second processing device fails to perform the steps of decryption, sending a third message to the first processing device if the second processing device complies with the rules set, and sending a fourth message to the first processing device if the second processing device fails to comply with the rules set.

Another embodiment of the invention is a method for encryption of a private media package by a first processing device. The method includes creating a private media package comprising a regret management flag, a rules set, and a media object(s), generating of a first unique encryption key (first key), encrypting with the first key the regret management flag, encrypting with the first key the rules set, encrypting with the first key the media object(s), obtaining a randomized result key, bit shifting the regret management flag from encrypting with the first key the regret management flag, via the randomized result key, bit shifting the rules set from encrypting with the first key the rules set, via the randomized key, bit shifting the media object(s) from encrypting with the first key the media object, via the randomized key, generating a second unique encryption key (second key), encrypting with the second key the regret management flag from encrypting and bit shifting the regret management flag, encrypting with the second key the rules set from encrypting and bit shifting the rules set, encrypting with the second key the media object(s) from encrypting and bit shifting the media object, and storing as an encrypted private media package the regret management flag of the encrypting with the second key the regret management flag, the rules set of the encrypting with the second key the rules set, and the media object(s) of the encrypting with the second key the media object.

Yet another embodiment of the invention is a method for decryption of a private media package by a second processing device. The method includes obtaining the second key from the server device, decrypting with the second key the regret management flag, decrypting with the second key the rules set, decrypting with the second key the media object(s), obtaining the randomized result key, reverse bit shifting the regret management flag from decrypting with the second key the regret management flag, via the randomized result key, reverse bit shifting the rules set from decrypting with the second key the rules set, via the randomized key, reverse bit shifting the media object(s) from decrypting with the second key the media object(s), via the randomized key, obtaining the first key, decrypting with the first key the regret management flag from decrypting with the second key and reverse bit shifting the regret management flag, decrypting with the first key the rules set from decrypting with the second key and reverse bit shifting the rules set, decrypting with the first key the media object(s) from decrypting with the second key and reverse bit shifting the media object, and outputting as a decrypted private media package the regret management flag of the decrypting with the first key the regret management flag, the rules set of the decrypting with the first key the rules set, and the media object(s) of the decrypting with the first key the media object(s).

Another embodiment of the invention is a method for point-to-point security of a private media package by a server device communicatively connected to a first processing device and a second processing device by a telecommunications network. The method includes storing records of authorization for the first processing device, checking authorization of the first processing device, storing the encrypted private media package, forwarding the encrypted private media package to second processing device(s), sending a first message to the first processing device if the second processing device performs the steps of decryption, sending a second message to the first processing device if the second processing device fails to perform the steps of decryption, sending a third message to the first processing device if the second processing device complies with the rules set, and sending a fourth message to the first processing device if the second processing device fails to comply with the rules set.

Yet another embodiment of the invention is a method for point-to-point security of a private media package by a server device communicatively connected to a first processing device and a second processing device by a telecommunications network. The method includes storing records of authorization for the second processing device, forwarding the encrypted private media package to a second processing device(s), checking authorization of the second processing device, providing a second key to the second processing device, detecting if the second processing device performs the steps of decryption with the second key, providing the first key to the second processing device if the step of detecting if the second processing device performs the steps of decryption is completed, detecting if the second processing device performs the steps of decryption with the first key, policing compliance by the second processing device with a rules set established with the server device by the first processing device, sending a first message to the first processing device if the second processing device successfully performs the steps of decryption, sending a second message to the first processing device if the second processing device fails to perform the steps of decryption, sending a third message to the first processing device if the second processing device complies with the rules set, and sending a fourth message to the first processing device if the second processing device fails to comply with the rules set.

BRIEF DESCRIPTION OF THE DRAWINGS

The present invention is illustrated by way of example and not limitation in the accompanying figures, in which like references indicate similar elements, and in which.

DETAILED DESCRIPTION

The following description refers to certain specific embodiments; however, the specific embodiments are merely illustrative and variations and changes may be made in the embodiments without diverting from the broad scope encompassed by the disclosure.

Figure 1:
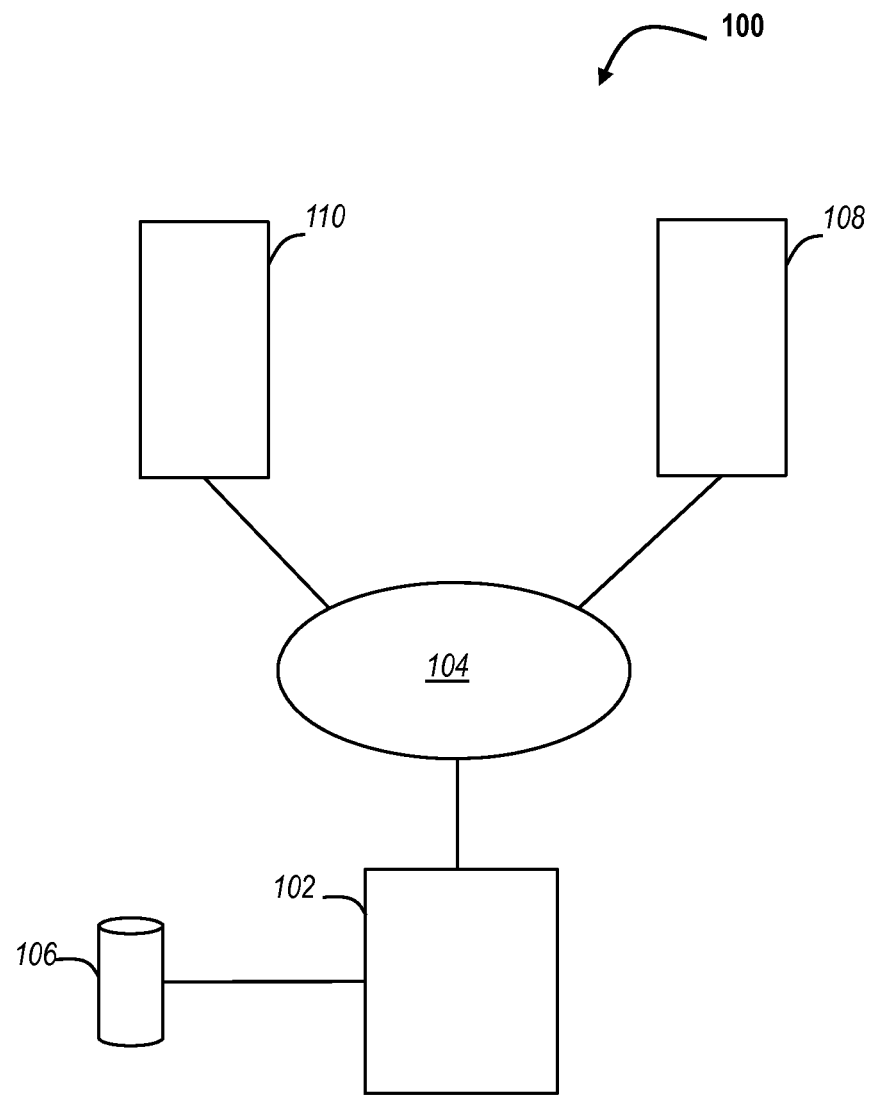
FIG. 1 illustrates a system for point-to-point security of a private media package, according to certain embodiments.

Referring to FIG. 1, a system 100 includes a manager engine 102. The manager engine 102 is communicatively connected to a communications network 104. The network 104 may be any one or more wireless or wired data communications link or network, or combination of those links or networks, for example, cellular, Wifi™ (e.g., radio wireless local area networking based on the IEEE 802.11 standards or other standards or protocols), Internet, intranet, virtual private network (VPN), local area network (LAN), wide area network (WAN), optical network, and others. The manager engine 102 includes communications elements for sending and receiving communications signals of the network 104. Although the manager engine 102 is illustrated as a single entity in the Figures, it should be understood that the manager engine 102 may be unitary or implemented in pluralities of elements. Likewise, although the network 104 is illustrated as a commonly accessed unit, it should be understood that the network may be any one or more telecommunications or data network, or pluralities of the same or different types of the network, and can include routers, switches, servers, and other elements.

The manager engine 102 communicatively connects to, or otherwise includes, a data storage 106. The data storage 106 may be, include or communicatively connect to a computer-readable medium, for example, permanent memory storage device, solid state drive, portable storage unit, flash memory, optical memory, magnetic memory or other data store, and may be one or more such data store.

One or more of a privatization device 110 is communicatively connected to the network 104. The privatization device 110 may, for example, be or include an app-enabled device or other communicative processing device. The privatization device 110 communicates with the manager engine 102 over the network 104. Although one of the privatization device 110 is illustrated in the Figures, it should be understood that any greater number is possible in the embodiments.

A recipient device 108 may also be communicatively connected to the network 104. The recipient device 108 may, for example, be or include an app-enabled device or other communicative processing device. The recipient device 108 communicates with the manager engine 102 over the network 104, and also with the privatization device 110 over the network 104 (which may, as nonexclusive example, be the same or different physical or communicative network, in whole or part). Although one of the recipient device 108 is illustrated in the Figures, it should be understood that any greater number is possible in the embodiments. In certain embodiments, not illustrated in the Figures but discussed herein, the privatization device 110 may also be the recipient device 108, if the intent of the privatization device 110 is to maintain private data objects, such as files, messages, graphics, media content, and others, on or communicatively accessible to the privatization device 110 when operating as a recipient device 108.

In operation, the privatization device 110 and the recipient device 108, whether the same or different units, elements or devices, in whole or part, according to the embodiments, can communicate over the network 104 with the manager engine 102. The privatization device 110 communicates to the manager engine 102 an authorizing identification for the privatization device 110. If the authorizing identification is recognized by the manager engine 102, the privatization device 110 creates (as later described) a private media package. The private media package is an encrypted structure that includes one or more media objects comprised of data of any format or formats, including but not limited to telemetry, photographs, images, text, video, audio, files, streaming sources, database information (including, but not limited to, components and structures), and any other type of digital or analog data, files or objects.

The privatization device 110 stores in memory of the privatization device 110 the private media package as encrypted. The privatization device 110 also maintains applicable keys for decryption of the private media package. Unless the privatization device 110, during the private media package creation process, dictates otherwise (for example, through shares or rules as later described), the privatization device 110 can decrypt the private media package and possibly use the media object in decrypted form.

The recipient device 108, which may be the privatization device 110, itself, or another device to which the private media package is communicated, communicates to the manager engine 102 an authorizing identification for the recipient device 108. If the authorizing identification is recognized by the manager engine 102, the recipient device 108 can decrypt the encrypted private media package and possibly use the media object(s) in decrypted form. Shares and rules, as later described, of the private media package are dictated by the privatization device 110 (or else by default), and dictate the further sharing and/or use of the media object(s) in decrypted form by the recipient device 108.

Figure 2:
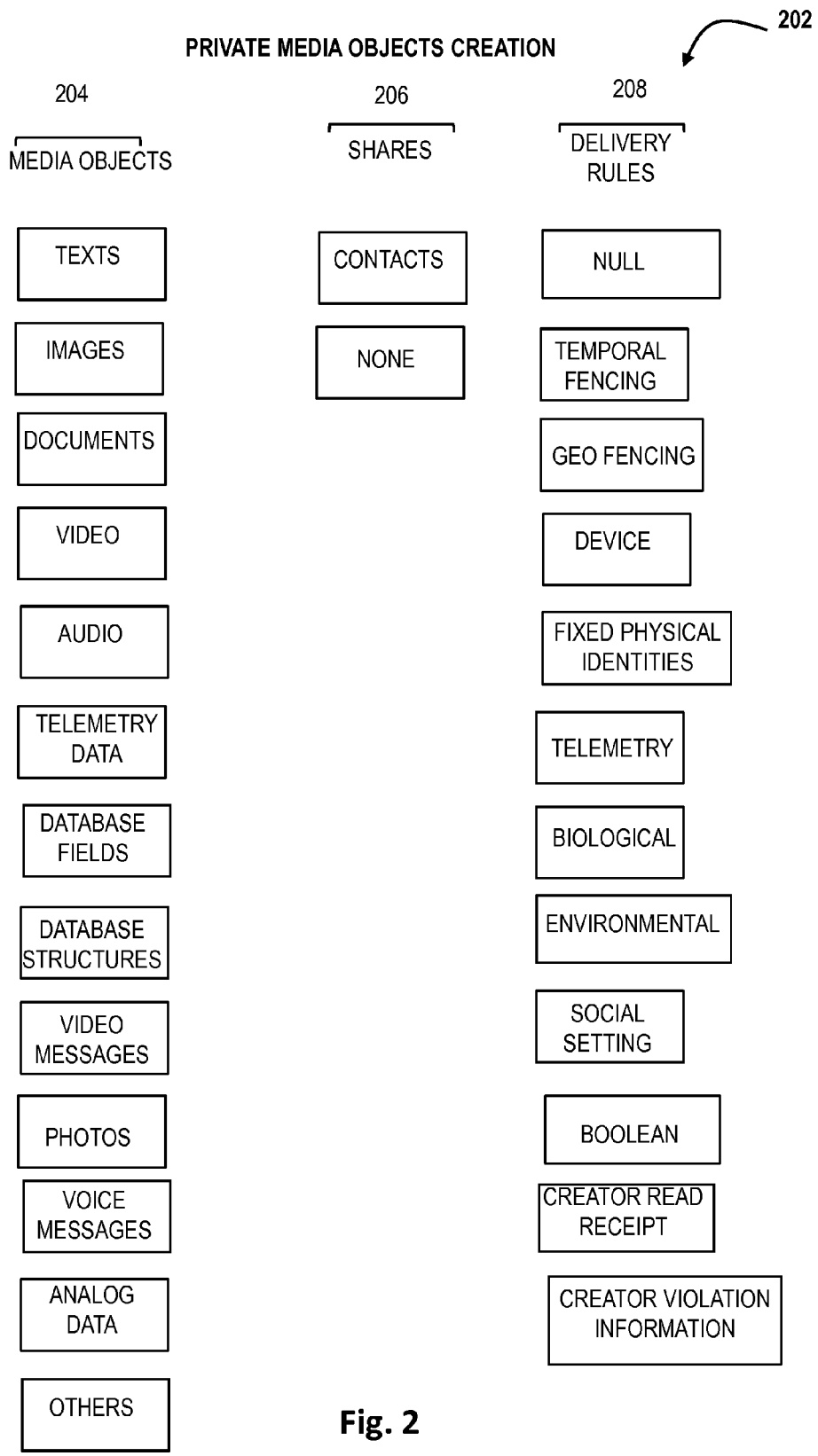
FIG. 2 illustrates a private media package structure of media object(s), shares and delivery rules, for encrypt, decrypt and rules compliance, according to certain embodiments.

Referring to FIG. 2, a private media package 200 has a private media package structure 202. The private media package structure 202 includes, data sources 204 of any format or formats, as non-exclusive example, telemetry, photographs, images, text, video, audio, files, streaming sources, database information (including, but not limited to, components and structures), and any other type of digital or analog data, files or objects, or combinations. The private media package structure 202 also includes any shares 206, if any, which shares are, for example, encrypted contacts for recipient devices 108 stored by the privatization device 110. Additionally, the private media package structure 202 includes a rules set 208 of the private media package 200. The rules set 208 may, as nonexclusive example, include NULL, temporal fencing, GEO fencing, device rules, fixed physical identifiers, telemetry rules, biological rules, environmental rules, social setting rules, creator violation information rules, creator read receipt rules, Boolean rules, or others.

Figure 3:
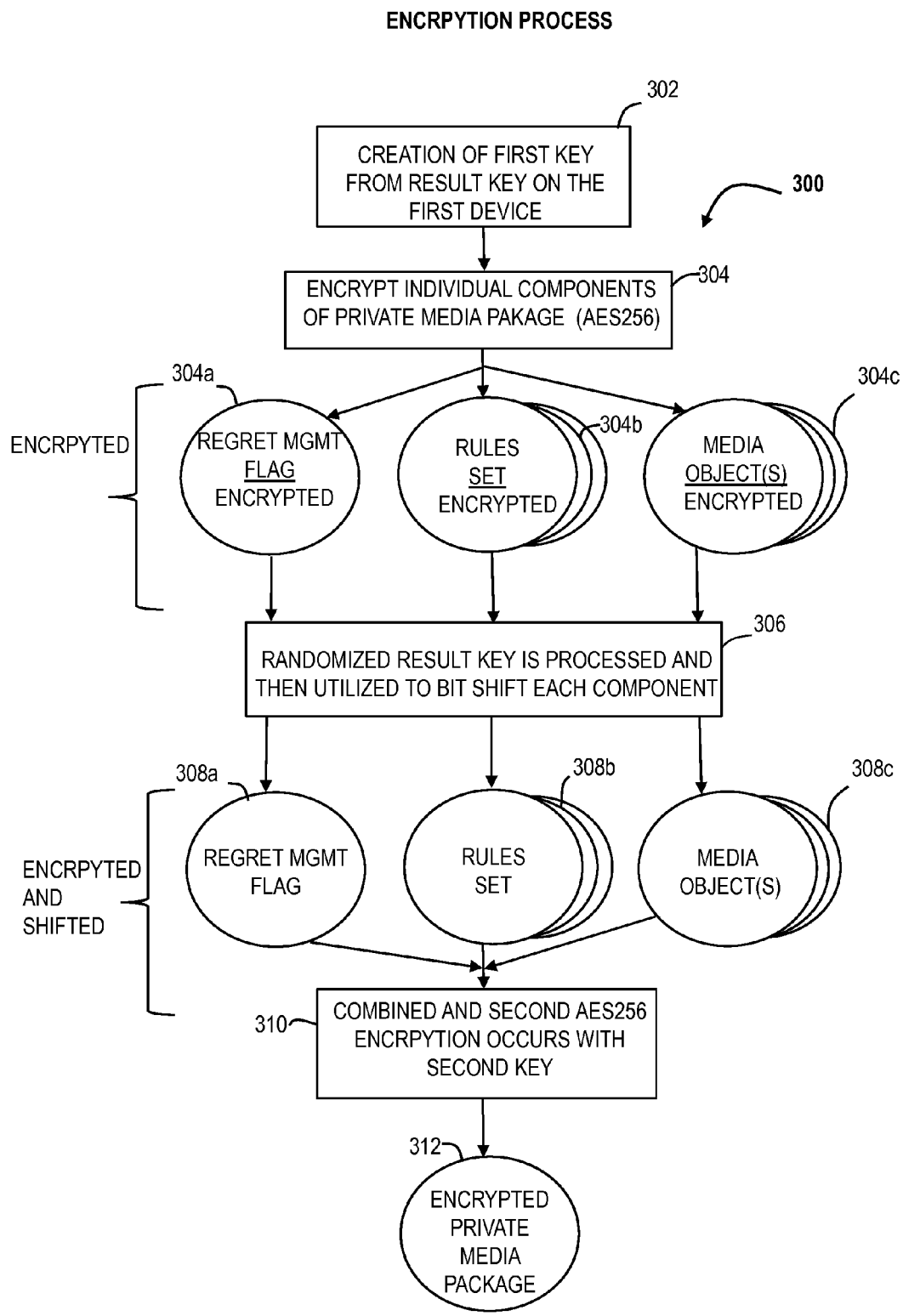
FIG. 3 illustrates a method for encryption of a private media package, according to certain embodiments.

Referring to FIG. 3, the privatization device 110 creates the private media package 200 in a method 300. The method 300 combines three components, each of which is encrypted separately into one encrypted package (also known as the encrypted private media package). The three components include a Regret Management Flag, a rules set, and the media object(s). In a step 302 of the method 300, a unique irst key is created on the privatization device 110. With the first key, the three components are individually encrypted 304. In the step 304, the Regret Management Flag is first encrypted 304a. The rules set is next encrypted 304b, and the media object(s) is encrypted 304c. Encryption may be according to AES256 standard or otherwise according to the implementation.

In a step 306 of the method 300, a randomized result key is processed. The randomized result key is employed to bit shift each of the encrypted Regret Management Flag 308a, rules set 308b, and media object 308c. The respective components of the encrypted and bit shifted Regret Management Flag, rules set and media object(s) are combined and again encrypted with a unique second key, which is generated on the privatization device 110, in a step 310.

Shares are set by the privatization device 110, for example, from encrypted contacts stored on the privatization device 110. Shares set by the privatization device 110 for any particular private media package dictate which, if any, recipient device 108 may receive the encrypted private media package. As non-exclusive example, the recipient device 108 may be designated for share of the encrypted private media package. The recipient device 108 for the share may include the privatization device 110, or not, and/or another of the recipient device 108 of the encrypted contacts maintained by the privatization device 110, as applicable.

Figure 4A:
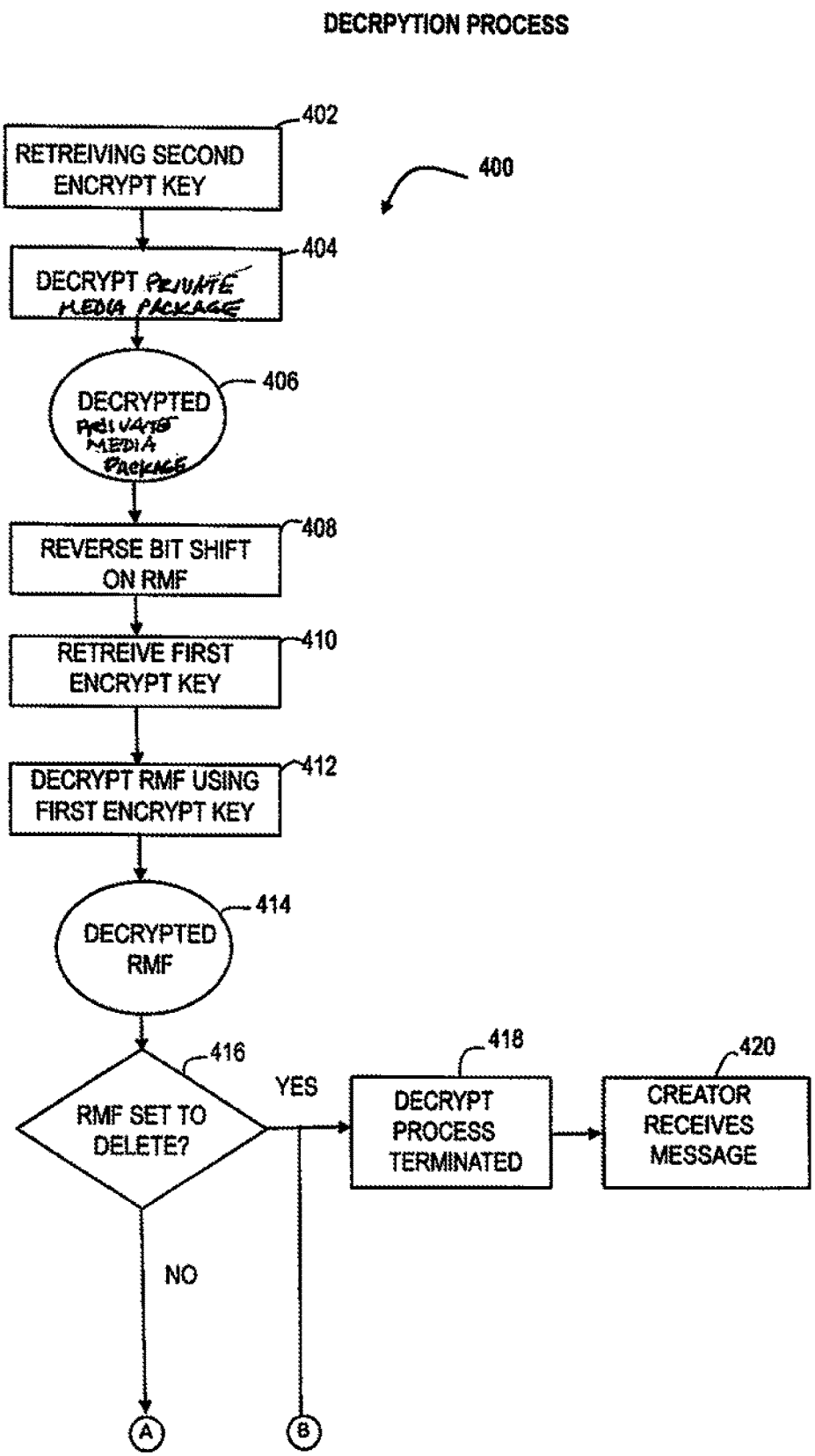
FIG. 4 illustrates a method for decryption of a private media package to obtain a decrypted media object(s) subject to rules compliance for use, according to certain embodiments.
Figure 4B:
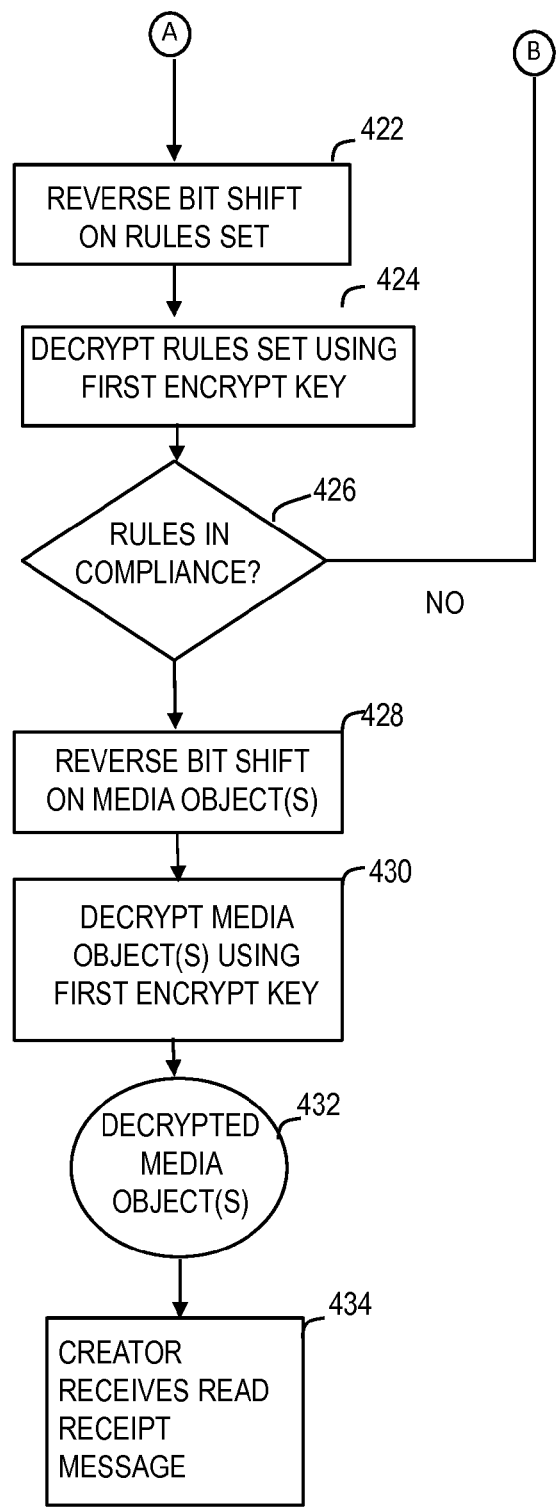

Referring to FIG. 4, the recipient device 108 of the share (e.g., whether the privatization device 110, itself, another device, or no device) decrypts the encrypted private media package 200 in a method 400. In the method 400, the second key is retrieved, such as from the manager engine 102 communicating over the network 104 with the recipient device 108, in a step 402. Employing the second key, the recipient device 108 first decrypts in a step 404 the encrypted private media package 200 to obtain a decrypted set of encrypted components of the private media package 200 (e.g., the encrypted Regret Management Flag, rules set and media object(s) components). This decrypted set of encrypted components is temporarily stored by the recipient device 108 in a step 406.

In a step 408 of the method 400, the recipient device 108 processes a reverse bit shift 408 on the encrypted Regret Management Flag component. The first key is retrieved, such as from the manager engine 102 communicating over the network 104 with the recipient device 108, by the recipient device 108 in a step 410. The encrypted Regret Management Flag component, as reverse bit shifted, is then decrypted in a step 412 using the first key. The reverse bit shifted and decrypted Regret Management Flag is temporarily stored by the recipient device 108 in a step 414.

The Regret Management Flag identifies the next processing by the recipient device 108. The Regret Management Flag may be set to delete or not as indicated by the step 416, as was dictated by the privatization device 110 in the method 300 for the particular private media package 200. If the Regret Management Flag is set to delete, then the decryption process terminates in a step 418. In a step 420, a notification is automatically sent by the recipient device 108 over the network 104 to the manager engine 102, the manager engine 102 creates a notice of no decryption, and the manager engine 102 send the notice over the network 104 for receipt by the privatization device 110.

If, on the other hand, the Regret Management Flag is set to other than delete, the rules set component is reverse bit shifted by processing of the recipient device 108 in a step 422. The reverse bit shifted rules set is then decrypted 424 by the recipient device 108 using the first key which was communicated to the recipient device 108 by the manager engine 102.

Once decrypted, the rules set is processed by the recipient device 108 in a step 426 to determine compliance with the rules of the rules set. The processing in the step 426 may, but need not necessarily in all instances, include communications by the recipient device 108 with the manager engine 102 over the network 104. The rules of the rules set will each dictate the process of compliance. If there is not compliance with any rule of the rules set, then the method 400 proceeds to step 418 of terminating the decryption process.

If, however, the rules of the rules set are complied with, the recipient device 108 processes a reverse bit shift in a step 428 of the media object(s) of the private media package 200. The recipient device 108 decrypts the media object(s) in a step 430 using the first key. The decrypted media object(s) is stored temporarily on the recipient device 108 in a step 432. On decryption of the step 430, the recipient device 108 communicates over the network 104 to the manager engine 102 the occurrence of the step 430. The manager engine 102, via communication over the network 102 with the privatization device 110, notifies the privatization device 110 that the decryption has occurred by the recipient device 108.

During the methods 300 and 400, the manager engine 102 manages the steps through continues pings of the manager engine 102 to the privatization device 110 and the recipient device 108, respectively. The manager engine 102 records details of the processing and operations of the privatization device 110 and the recipient device 108 in the methods 300 and 400, respectively. As non-exclusive examples, the manager engine 102 may store in the data store 106 (or otherwise) records of applicable shares, rules, state of the privatization device 110 and/or recipient device 108, share and rule compliance or non-compliance, and otherwise. The manager engine 102 may also, in non-exclusive examples, intermediate communications of the private media package between the privatization device 110 and recipient device 108, as well as store or maintain copies of the private media package. The manager engine 102 may be communicatively connected to cloud storage, and the data store may be or include cloud storage.

A non-exclusive example of certain embodiments follows:

An application program, such as an app, is installed and stored in tangible media in a processing device, for example, the privatization device 110 and the recipient device 108. Examples of the processing device include a processor, memory, and a bus communicatively connecting the processor and memory, such as smartphone, tablet, laptop computer, desktop computer, or other. The application program installed on the processing device is processed by the processor to encrypt text communications, notes, videos, photos and other media types that are secure and undecipherable to anyone but the intended recipient device(s), which are themselves processing devices having the installed application program stored in tangible media.

Figure 5:
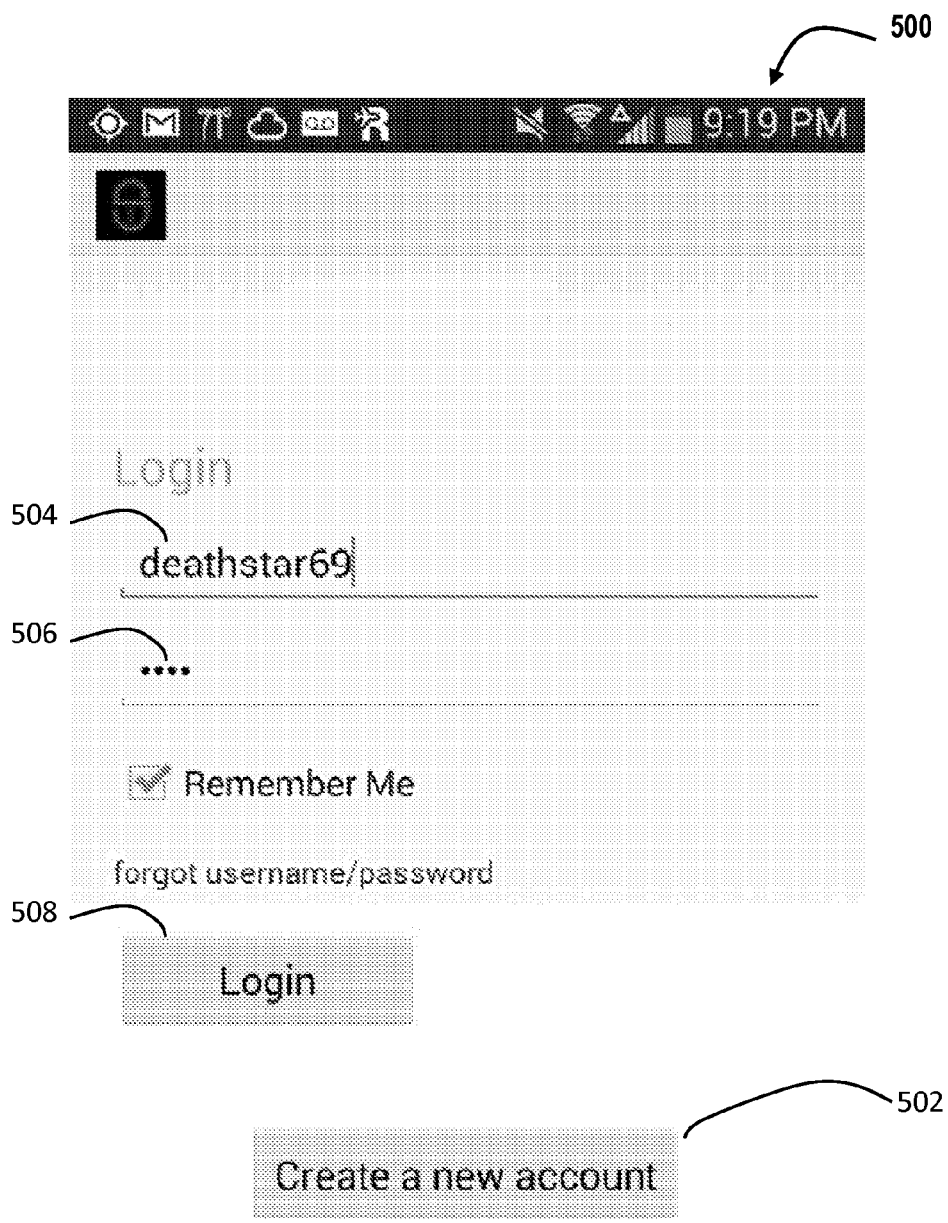
FIG. 5 illustrates an example application interface of a processing device, for login to a manager engine for point-to-point security of a private media package, according to certain embodiments.

Referring to FIG. 5, in certain examples, the application program, when processed by the processing device, displays in the processing device an authorization graphic 500. The authorization graphic 500 communicates with a server computer containing or communicatively accessing records stored in tangible media of authorized users and passwords. If a new user, the user may create an account with an account creation button 502, in the records of or accessed by the server computer. If an existing user having created an account in the records of or accessed by the server computer, the graphic 500 requires entry of a user name 504 and respective password 506 for the user. Once applicable user name 504 and password 506 are entered, the user can input to a login button 508 for login for use of the encryption applications associated with the application program and the server computer. Records of or accessed by the server computer may be maintained in a database, cloud storage or other store communicatively connected to the server computer.

Figure 6:
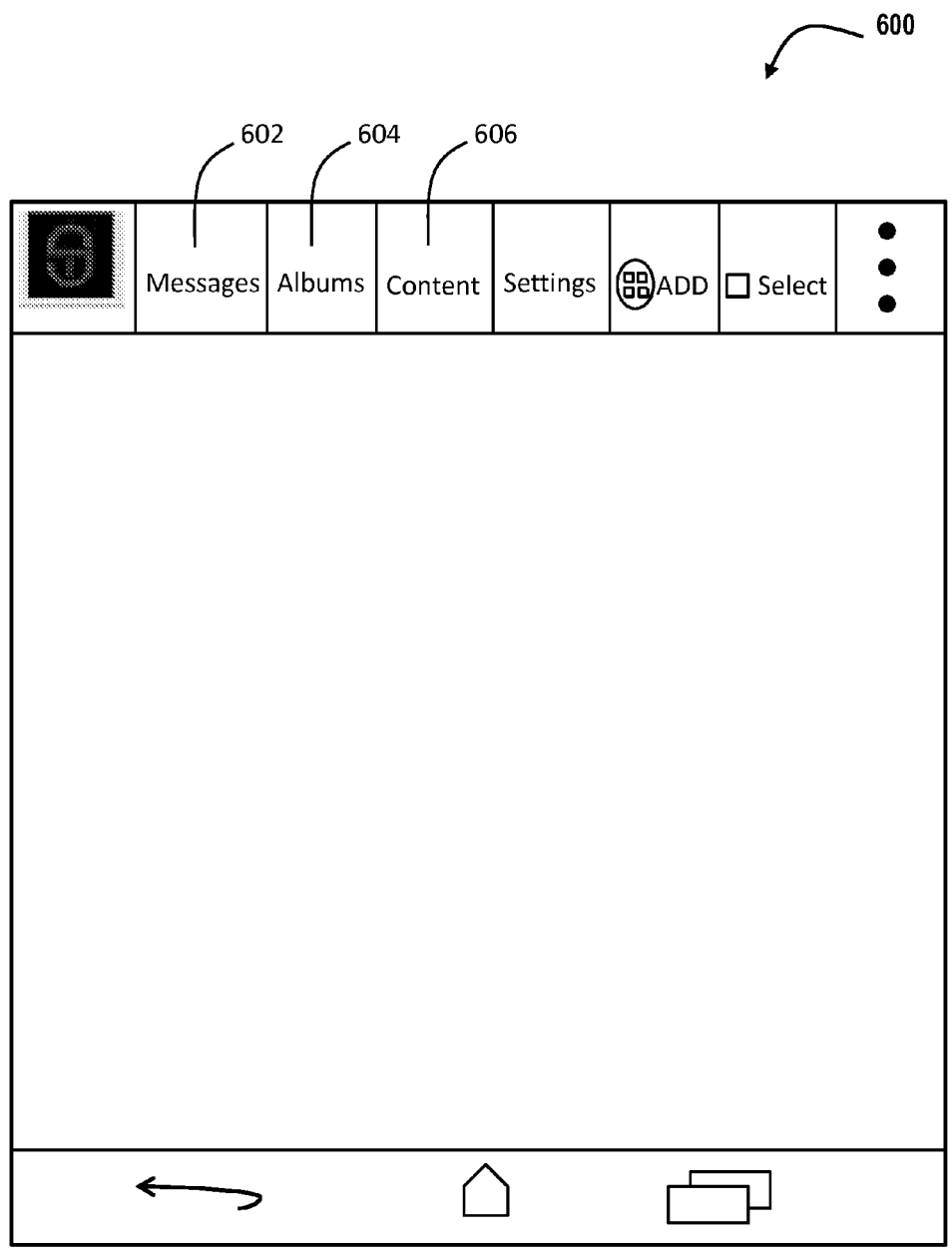
FIG. 6 illustrates an example menu interface of a processing device, for read and entry of messages, media objects, and store of contacts for shares in point-to-point secure storage and communication, according to certain embodiments.
Figure 7:
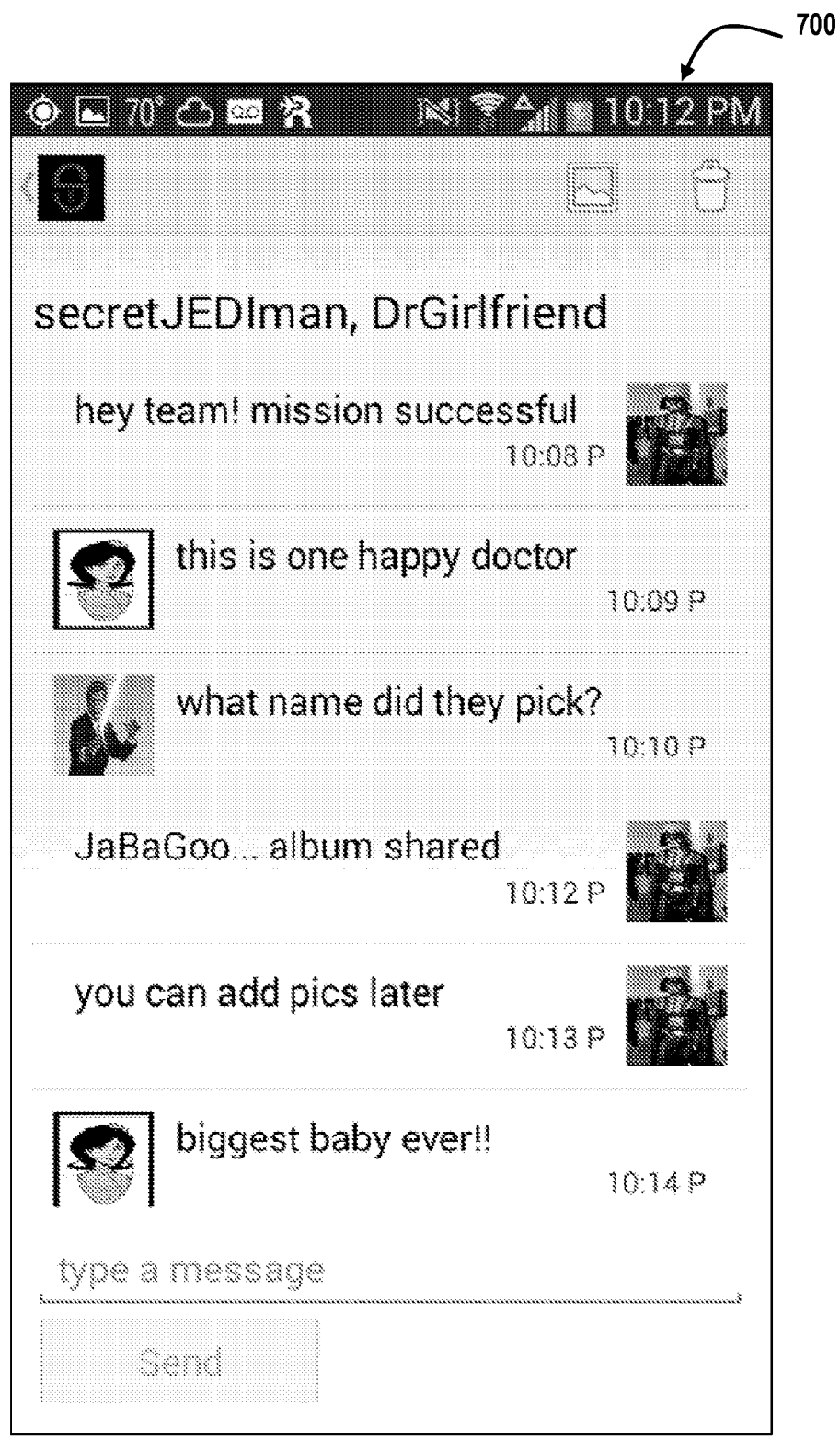
FIG. 7 illustrates an example messages display of a processing device, of secure messages of communicated private media package(s), according to certain embodiments.

Referring to FIG. 6, the logged in user is, through communication with the server computer, presented with a graphical menu 600. The graphical menu 600 allows the logged in user to enter for encryption, items of contacts, rules of rules set(s), and media objects, such as pictures, text, video, documents, or other. Added items are encrypted and may be stored on the processing device, itself (as in the case of contacts items), or in records maintained by or on the server computer and/or processing device (in the case of media objects and rules items). In the example, the user may enter a "Messages" tab 602 to enter (by adding) a message item that is encrypted and to decrypt and read any then-pending or available message items, as permitted by associated rules set by the sender processing device for the message item (e.g., FIG. 7). Similarly, the user may enter an "Albums" tab 604 to enter (by adding) a media item that is encrypted either for distribution to contacts or for storage on the user's processing device and to decrypt and view any then available media item that was received in encrypted form from another processing device, assuming any associated rules are in compliance. Further, the user may enter a "Contacts" tab 606 to enter (by adding) a contact item that is encrypted and stored on the user's processing device or to view previously entered and encrypted contact items on the user's processing device. The graphical menu 600 may include additional items, such as, for example, an "Add" button, "Select" button, application settings tabs, and others.

Media objects that are encrypted for the processing device, and capable of share with any contact, include any data format or formats which include, but are not limited to, telemetry, photographs, images, text information, all video and audio formats, including files and streaming sources, database information including but not limited to components and structures, and any other types digital and analog data. Media objects are structured by the processing device to allow for share of any combination of the media objects with anyone or any group within the predefined encrypted contacts library, or, the media objects structure provides the option of not sharing any of the media objects once encrypted for secure storage on the creators device(s). Within the media object structure the ability is provided to forcibly enable the adherence to specific Rules Set for media objects once encrypted. These include, but are not limited to, NULL, Number of views, Temporal Fencing, GEO Fencing, Device, Fixed Physical Identifiers, Boolean, Biological, DNA, Telemetry, Environmental, and other stationary or non-stationary requirements, or social setting.

Figure 8:
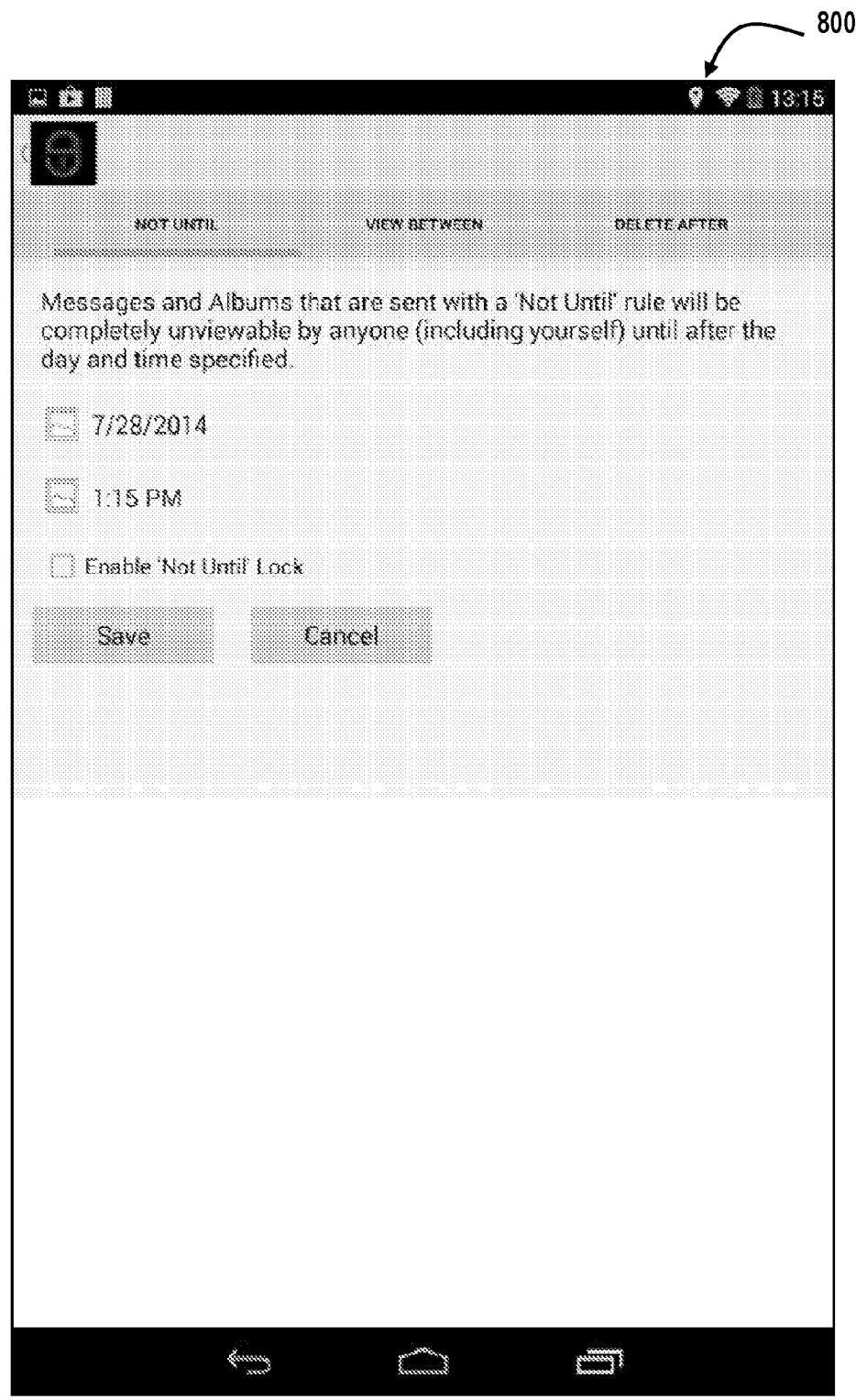
FIG. 8 illustrates an example delayed time rule item for choice of rules set for a private media package, according to certain embodiments.
Figure 9:
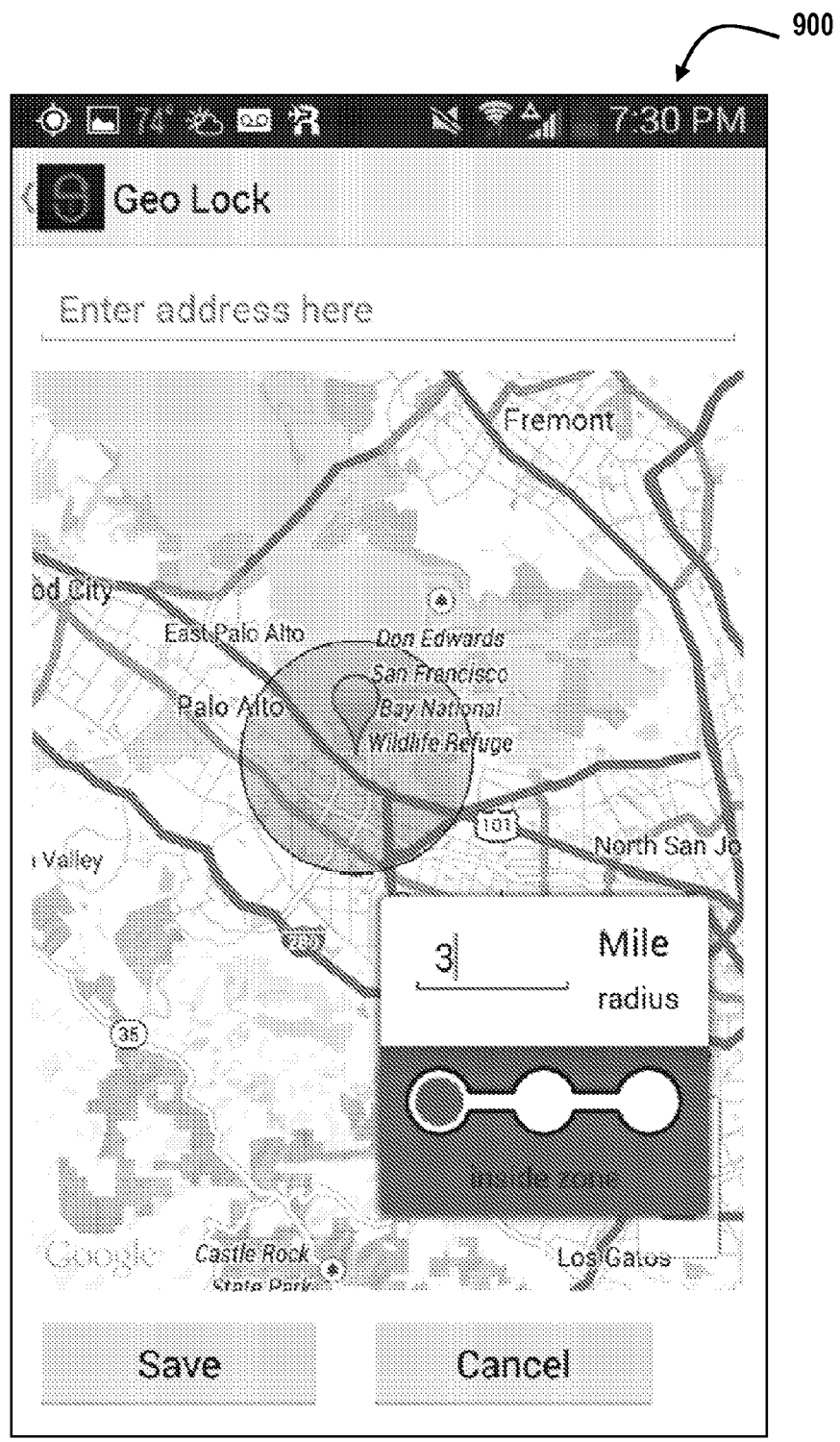
FIG. 9 illustrates an example geographical rule item for choice of rules set for a private media package, according to certain embodiments.
Figure 10:
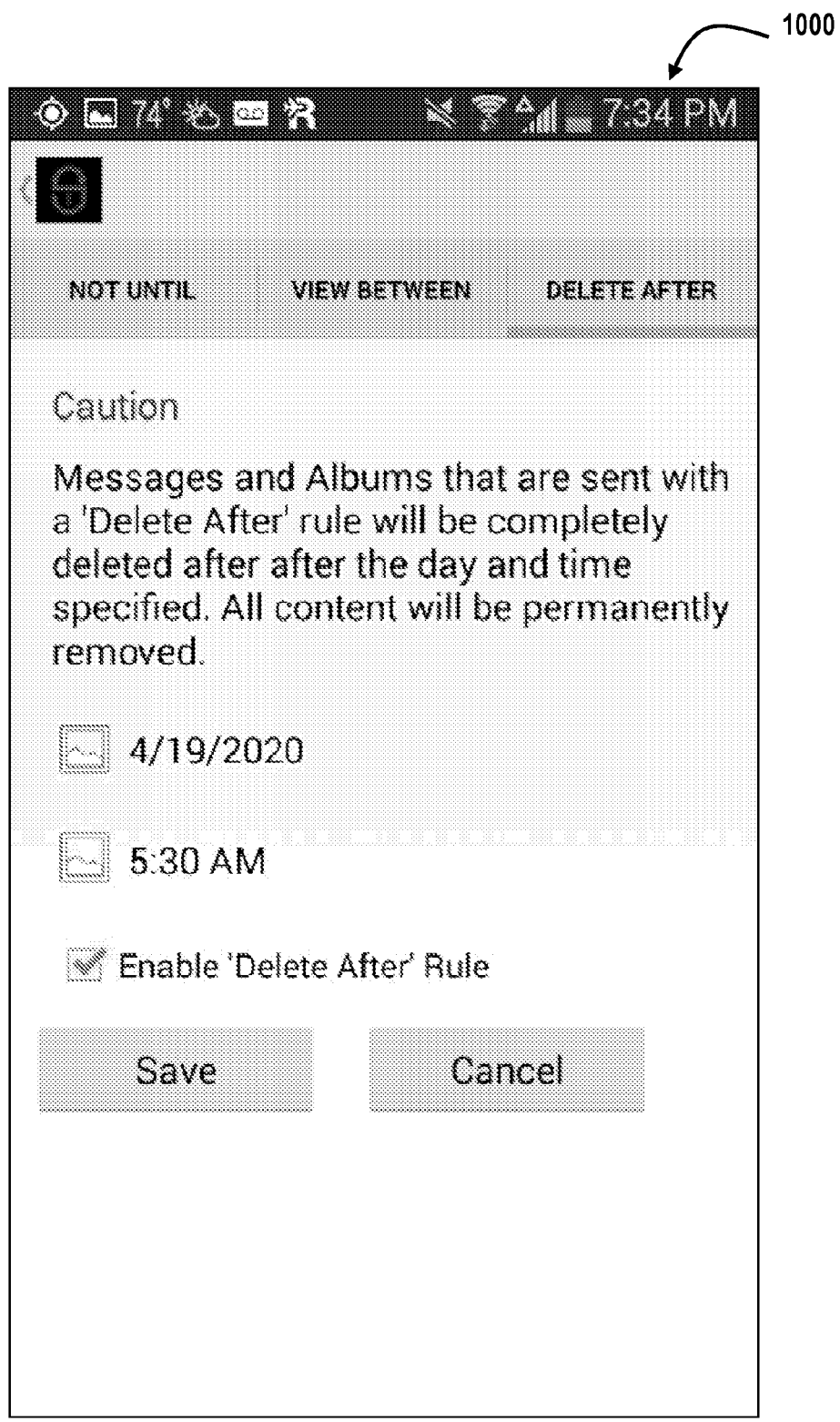
FIG. 10 illustrates an example expiration time rule item for choice of rules set for a private media package, according to certain embodiments.

Referring to FIGS. 8, 9 and 10, rules of rule sets may be presented as interface graphics 800, 900, 1000. As non-exclusive example, rules may restrict decryption through "Not Until" particular date or time (e.g., graphic 800 of FIG. 8), geographic territory (e.g., graphic 900 of FIG. 9), "Delete After" particular date or time (e.g., graphic 1000 of FIG. 10), or any other rule possibility. Exemplary rules and rule sets may include any of the following, alone or in combination—

Rules and Rule Sets

NULL:

If the NULL setting is selected, the Private Media Objects will be encrypted for transport but will not contain any additional rules requirements. With the exception of the NULL, Rules are designed to be utilized singularly, in combination with one another, or can become components within a Boolean expression designed to create a highly granular security rule.

Temporal Fencing:

Provides the ability to establish temporal rules for decryption of Private Media Objects providing the Temporal Fencing rules are met. Temporal Fencing rules include but are not limited to any combination of the following.

Date and date range

Enable, and or disable time

Deactivation time and or date

Star date

GEO Fencing:

Provides the ability to establish GEO Fencing rules for decryption of Private Media Objects providing the GEO Fencing rules are satisfied. GEO Fencing rules include, but are not limited to, any combination of the following:

GEO Inclusion and Exclusion Zones, which allow decryption of Private Media Objects to be accomplished when the GEO Fencing rules are met.

Multi recipient GEO Fencing condition matching which forces multiple recipients to meet a series of GEO Fencing requirements such as;

Fixed destinations

Multiple fixed destinations.

Device Rules:

Are designed to provide decryption of Private Media Objects provided the Device Rules are met. This rules set is designed to recognize specific hardware devices, operating systems and any combination, but not limited to hardware operating on embedded systems, or hardware specific properties.

Fixed Physical Identifiers (FPI):

Are a series network identifiers which are comprised of but not limited to IP Address, MAC Address, SDI, Phone number, SSID, Network ID, Domain, and any combination which provides the ability to establish FPI rules for decryption of Private Media Objects providing the FPI rules are met.

Telemetry Rules:

Are designed to provide decryption of Private Media Objects providing that a series of predefined Telemetry Rules are met. This rules set is designed to recognize and interpret various types of systemic behavior provided by internal or external device stimulus, and any combination stimuli.

Biological Rules:

Are designed to provide decryption of Private Media Objects, providing that a series of predefined Biological Rules are met. This rules set is designed to recognize and interpret various types of biological information provided by internal or external device stimulus, and any combination of stimuli including but not limited to heart rate, body temperature, blood pressure, blood sugar level, extremities motion, response to outside stimulus, and DNA.

Environmental Rules:

Are designed to provide decryption of Private Media Objects providing that a series of predefined Environmental Rules are met. This rule set is designed to recognize and interpret various types environmental information provided by internal or external device stimulus, and any combination of stimuli including but not limited to heat, humidity, barometric pressure, wind speed, rainfall, snowfall, changes in light or darkness, magnetic field, and radiation.

Social Setting Rules:

Are designed to provide or disallow decryption of Private Media Objects or the prevention of the encryption of Private Media Objects providing that a series of predefined Social Setting Rules are met. This rules set is designed to recognize and react to a governing authority within a social Setting, which will allow or disallow use of the framework.

Creator Violation Information Rules:

Determines whether or not either full detail or general information is provided to the created during any attempt to access the Private Media Package in non-compliance with the Rules Set. General information will simply specify that a Rules Set violation occurred. Full Detail will provide the specific Rules Set violation and includes, but is not limited to, Device Name, ID and type, recipient information, type of violation, GEO information, and Network Specific Information.

Creator Read Receipt Rules:

Determines whether or not to notify the Creator when their Private Media Package are accessed by the recipient(s). If this Rules Set is set to NO—the default—no Read Receipt is sent. If this Rules Set is set to YES, then the next sub-option is whether a general information or full detail is provided to the creator. If general information is requested, then the recipient ID and the date/time read will be sent. Full Detail will provide, but is not limited to, recipient ID, date/time read, Device Name, ID and type, Media Objects, GEO information, and Network Specific Information.

Boolean Rules:

Provide the ability to utilize any and all of the Rules Sets for the decryption of Private Media Objects utilizing standard Boolean expressions where the expression input is provided by the selected Rules Sets at the time of Data Source encryption.

Encryption Process

The Encryption Process is designed to combine three key components, which are encrypted separately into one encrypted package (known as encrypted Private Media Package). This phased process occurs on the device prior to transmission. The three key components of the encrypted package contain the Regret Management Flag, the Rules Set, and the Media Object(s).

Special Notes:

The Regret Management Flag provides the framework with the ability to enable the creator of the Private Media Package to immediately and permanently remove all shared content from any device, user, or group, or any combination.

Initial encryption is performed using AES256, with a key generated from a password process PAKSET (e.g., a Unique or other Process), yielding the result seed, which is then used to generate the first encrypt key. Each component of the Private Media Package is encrypted separately, and depending on the data size and type each Media component can be parsed for additional segmentation.

The process begins with the encryption of each Rule of the Rules Set. Each Rule is encrypted and stored separately beginning with the Regret Management Rule. All Rules of the Rules Set apply, and each is encrypted regardless of the value. NULL Rules are also encrypted. The physical Media object(s) is/are encrypted in the same manner, however, depending on size, number of media objects, media types, and customer consideration, each Media object can be broken down further and segmented, allowing for separation, and distribution of segments across multiple server platforms in their encrypted state for reassembly during the decryption process.

Once the three key components are encrypted, the randomized Result Seed used to generate the key value is modified bitwise to expand the length with resulting values ranging from 0 to 7. These values are then used to bit shift the encrypted data. This process is applied separately to the Rules Sets, Regret Management Flag, and the Media Objects.

Finally, Encrypted Rules, Regret Management Flag, and Media Objects are then combined, encrypted using a second encrypt key, and stored as a single encrypted Private Media Package for transmission.

Decryption Process

The Decryption Process utilizes the keys stored during the encryption process to start the process of phased decryption, and begins when a request for Authorization for Use is sent to the server device from a primary (e.g., a first processing device) or secondary processing device (e.g., a second processing device or devices, as applicable, which second processing device may but need not necessarily be or include the first processing device).

The private media package is decrypted using the second key generated, and then the Regret Management Flag ("RMF") has the effect of the bit shift reversed and then decrypted using the first generated key prior to any further consideration for decryption of the remaining private media package. The RMF is then interrogated and if it is set to "Delete", all corresponding components within the private media package are deleted permanently If the RMF is not set to "Delete", the Decryption Process continues by reversing the effect of the bit shift and then decrypting the Rules Set using the first generated key. If the Rules Set is found not to be in compliance (either by virtue of any Rule not be satisfied or the overall Rules Set does not match between the Server and the receiving device(s)), the following steps take place:

the Decryption Process is then terminated and no further decryption takes place;

an encrypted message is immediately generated which contains either general information or the full details regarding the Rules Set violation (based on the Creator Violation Rules Set) including, but not limited to the Device name, ID and type, recipient information, type of violation, GEO information, and Network Specific Information.

The creator is then sent this encrypted message for review and action.

If all of the Rules Sets are met, the Decryption Process reverses the effect of the it shift and then decrypts the Media object(s) on the recipient's device, using the first generated key, for review and action by the recipient(s) including, but not limited to: review; utilization; or editing of the Media object(s) (If allowed by the creator), only within the Application and will be permanently deleted upon either leaving the Application or the creator setting the RMF to "Delete". As a note, the RMF will be interrogated on a consistent timed basis to detect any change in the RMF status.

Once the Decryption Process is complete, an encrypted message is immediately generated which contains the full details regarding the completion of the Decryption Process including, but not limited to the Device name, ID and type, recipient information, GEO information, and Network Specific Information. This encrypted message is then sent to the creator for review and action, if required.

In the foregoing embodiments, it is contemplated that one or more processing device, which may be a privatization device, recipient device, or both, communicatively connect to one or more manager engine, which may be one or more server computer for communicatively interfacing with an application program, logic circuit, or combinations of the processing device(s). The manager engine, which may be one or more server computer and any associated database, stores, maintain and controls rules, rule sets, and interface supports.

In certain alternatives, the systems and methods are incorporated, in whole or part, as a service. In other alternatives, the systems and methods are incorporated, in whole or part, in or with a product or security application. The systems and methods are Health Insurance Portability and Accountability Act (HIPAA) compliant, and can provide encrypted mobile, desktop, server and device communications and encrypted data storage for healthcare and other industries. The embodiments are scalable to multiple vertical market segments. Point-to-point data and communication privacy is provided through encryption algorithms and processes that protect information during transmission, after transmission and at rest.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system for point-to-point security of media objects communicated on a telecommunications network, comprising:

a first processing device communicatively connected to the telecommunications network, including instructions stored in tangible media for:
  creating a private media package of a regret management flag, a rules set, and a media object;
  generating a first key for use in encryption;
  encrypting with the first key the regret management flag;
  encrypting with the first key the rules set;
  encrypting with the first key the media object;
  obtaining a randomized result key;
  bit shifting the regret management flag from encrypting with the first key the regret management flag, via the randomized result key;
  bit shifting the rules set from encrypting with the first key the rules set, via the randomized result key;
  bit shifting the media object from encrypting with the first key the media object, via the randomized result key;
  generating a second key for use in encryption;
  encrypting with the second key the regret management flag from encrypting and bit shifting the regret management flag;
  encrypting with the second key the rules set from encrypting and bit shifting the rules set;
  encrypting with the second key the media object from encrypting and bit shifting the media object;
  storing as an encrypted package the regret management flag of the encrypting with the second key the regret management flag, the rules set of the encrypting with the second key the rules set, and the media object of the encrypting with the second key the media object.

2. The system of claim 1, further comprising:
a second processing device communicatively connected to the first processing device via the telecommunications network, the second processing device including instructions stored in tangible media for:
  obtaining the second key;
  decrypting with the second key the regret management flag;
  decrypting with the second key the rules set;
  decrypting with the second key the media object;
  obtaining a randomized result key;
  reverse bit shifting the regret management flag from decrypting with the second key the management flag, via the randomized result key;
  reverse bit shifting the rules set from decrypting with the second key the rules set, via the randomized result key;
  reverse bit shifting the media object from decrypting with the second key the media object, via the randomized result key;
  obtaining the first key;
  decrypting with the first key the regret management flag from decrypting with the second key and reverse bit shifting the regret management flag;
  decrypting with the first key the rules set from decrypting with the second key and reverse bit shifting the rules set;
  decrypting with the first key the media object from decrypting with the second key and reverse bit shifting the media object;
  outputting as a decrypted package the regret management flag of the decrypting with the first key the regret management flag, the rules set of the decrypting with the first key the rules set, and the media object of the decrypting with the first key the media object.

3. The system of claim 2, further comprising:
a server device communicatively connected to the first processing device by the telecommunications network, the server device includes instructions stored in tangible media for:
  storing records of authorization for the first processing device;
  checking authorization of the first processing device;
  storing the encrypted private media package;
  forwarding the encrypted private media package to a second processing device;
  sending a first message to the first processing device if the second processing device performs the steps of decryption;
  sending a second message to the first processing device if the second processing device fails to perform the steps of decryption;
  sending a third message to the first processing device if the second processing device complies with the rules set; and
  sending a fourth message to the first processing device if the second processing device fails to comply with the rules set.

4. A method for encryption of a private media package by a first processing device, comprising:
  creating a private media package of a regret management flag, a rules set, and a media object;
  generating a first key for use in encryption;
  encrypting with the first key the regret management flag;
  encrypting with the first key the rules set;
  encrypting with the first key the media object;
  obtaining a randomized result key;
  bit shifting the regret management flag from encrypting with the first key the management flag, via the randomized result key;
  bit shifting the rules set from encrypting with the first key the rules set, via the randomized result key;
  bit shifting the media object from encrypting with the first key the media object(s), via the randomized result key;
  generating a second key for use in encryption;
  encrypting with the second key the regret management flag from encrypting and bit shifting the regret management flag;
  encrypting with the second key the rules set from encrypting and bit shifting the rules set;
  encrypting with the second key the media object from encrypting and bit shifting the media object;
  storing as an encrypted package the regret management flag of the encrypting with the second key the regret management flag, the rules set of the encrypting with the second key the rules set, and the media object of the encrypting with the second key the media object.

5. A method for decryption of a private media package by a second processing device, comprising:
  obtaining a second key;
  decrypting with the second key a regret management flag;
  decrypting with the second key a rules set;
  decrypting with the second key a media object;
  obtaining a randomized result key;
  reverse bit shifting the regret management flag from decrypting with the second key the management flag, via the randomized result key;
  reverse bit shifting the rules set from decrypting with the second key the rules set, via the randomized result key;

reverse bit shifting the media object from decrypting with the second key the media object, via the randomized result key;

obtaining a first key;

decrypting with the first key the regret management flag from decrypting with the second key and reverse bit shifting the regret management flag;

decrypting with the first key the rules set from decrypting with the second key and reverse bit shifting the rules set;

decrypting with the first key the media object from decrypting with the second key and reverse bit shifting the media object;

outputting as a decrypted package the regret management flag of the decrypting with the first key the regret management flag, the rules set of the decrypting with the first key the rules set, and the media object of the decrypting with the first key the media object.

6. A method for point-to-point security of a private media package by a server device communicatively connected to a first processing device and a second processing device by a telecommunications network, comprising:

storing by the server device records of authorization for the first processing device;

checking by the server device authorization of the first processing device;

storing by the server device an encrypted private media package from the first processing device;

forwarding by the server device the encrypted private media package to a second processing device;

sending by the server device a first message to the first processing device if the second processing device performs decrypting of the encrypted private media package;

sending by the server device a second message to the first processing device if the second processing device fails to perform decrypting of the encrypted private media package;

sending by the server device a third message to the first processing device if the second processing device complies with the rules set; and sending by the server device a fourth message to the first processing device if the second processing device fails to comply with the rules set.

7. A method for point-to-point security of a private media package by a server device communicatively connected to a first processing device and a second processing device by a telecommunications network, the private media package is received by the second processing device from the first processing device as an encrypted private media package, comprising:

storing by the server device records of authorization for the second processing device;

checking by the server device authorization of the second processing device;

providing by the server device a second key to the second processing device for a first decrypting of the encrypted private media package;

detecting by the server device if the second processing device performs first decrypting of the encrypted private media package with the second key;

providing by the server device a first key to the second processing device for a second decrypting of the encrypted private media package;

detecting by the server device if the second processing device performs the second decrypting of the encrypted private media package with the first key;

policing by the server device compliance by the second processing device with a rules set established with the server device by the first processing device;

sending by the server device a first message to the first processing device if the second processing device successfully performs the first decrypting;

sending by the server device a second message to the first processing device if the second processing device fails to perform the first decrypting;

sending by the server device a third message to the first processing device if the second processing device complies with the rules set; and sending by the server device a fourth message to the first processing device if the second processing device fails to comply with the rules set.

* * * * *